United States Patent
Chen et al.

(10) Patent No.: US 11,380,003 B2
(45) Date of Patent: Jul. 5, 2022

(54) MONOCULAR CAMERA LOCALIZATION IN LARGE SCALE INDOOR SPARSE LIDAR POINT CLOUD

(71) Applicant: Black Sesame International Holding Limited, Santa Clara, CA (US)

(72) Inventors: Yu Chen, San Jose, CA (US); Guan Wang, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 58 days.

(21) Appl. No.: 16/533,389

(22) Filed: Aug. 6, 2019

(65) Prior Publication Data

US 2020/0410701 A1 Dec. 31, 2020

Related U.S. Application Data

(60) Provisional application No. 62/866,509, filed on Jun. 25, 2019.

(51) Int. Cl.
| | | |
|---|---|---|
| *G06T 7/521* | (2017.01) | |
| *G06N 3/08* | (2006.01) | |
| *G06T 7/73* | (2017.01) | |
| *G01S 17/89* | (2020.01) | |

(52) U.S. Cl.
CPC .............. *G06T 7/521* (2017.01); *G01S 17/89* (2013.01); *G06N 3/084* (2013.01); *G06T 7/73* (2017.01); *G06T 2207/10028* (2013.01)

(58) Field of Classification Search
CPC .. G06K 9/0063; G06K 9/6202; G06K 9/6268; G06K 9/00771; G06K 9/6256; G08B 21/18
See application file for complete search history.

(56) References Cited

U.S. PATENT DOCUMENTS

| | | | | |
|---|---|---|---|---|
| 9,525,862 | B2 * | 12/2016 | Benhimane | G06T 7/246 |
| 2017/0262736 | A1 * | 9/2017 | Yu | G06K 9/627 |
| 2017/0278231 | A1 * | 9/2017 | Narasimha | G06T 7/277 |
| 2017/0365094 | A1 * | 12/2017 | Liu | G06T 7/62 |
| 2019/0011927 | A1 * | 1/2019 | Mou | G06K 9/00791 |

(Continued)

FOREIGN PATENT DOCUMENTS

| | | | | |
|---|---|---|---|---|
| CN | 109658445 | * | 12/2018 | G06T 7/33 |
| EP | 2656309 | * | 12/2016 | G06T 7/20 |
| KR | 2009011376 | * | 11/2009 | G05D 1/02 |

(Continued)

OTHER PUBLICATIONS

C. Bodensteiner and M. Arens: "Real-time 2D Video/3D LiDAR Registration"; Nov. 11-15, 2012; 21st International Conference on Pattern Recognition (ICPR 2012); pp. 2206-2209. (Year: 2012).*

(Continued)

*Primary Examiner* — Siamak Harandi
(74) *Attorney, Agent, or Firm* — Timothy T. Wang; Ni, Wang & Massand, PLLC (57) ABSTRACT

A method of camera localization, comprising, receiving a camera image, receiving a LiDAR point cloud, estimating an initial camera pose for the camera image, sampling an initial set of depth projections within the LiDAR point cloud, measuring a similarity of the initial camera pose to the initial set of depth projections and deriving a subsequent set of depth projections based on the measured similarity.

16 Claims, 11 Drawing Sheets

(56) References Cited

U.S. PATENT DOCUMENTS

2020/0159239 A1* 5/2020 Li ..................... G05D 1/0088

FOREIGN PATENT DOCUMENTS

WO     WO-2010080121 A1 * 7/2010 ......... G06K 9/00335
WO     WO-2018125014 A1 * 7/2018 ......... G06K 9/00798

OTHER PUBLICATIONS

C. Bodensteiner, W. Hubner; K. Jungling; P. Solbrig; M. Arens: "Monocular Camera Trajectory Optimization using LiDAR Data"; 2011; IEEE International Conference on Computer Vision Workshops; pp. 2018-2025. (Year: 2011).*

* cited by examiner

| | |
|---|---|
| SPST | same parking garage, same collection time |
| SPDT | same parking garage, different collection time |
| SPDTDC | same parking garage, different collection time, different camera direction |
| training-pure | the training and the inference data from same garage different trajectories |
| training-mix | the training and the inference data from different garage different trajectories |

912

| Space | Training | $E_{trans}$ | $E_{rotation}$ | $E_x$ | $E_y$ | $E_z$ | $E_{roll}$ | $E_{pitch}$ | $E_{yaw}$ |
|---|---|---|---|---|---|---|---|---|---|
| SPST | pure | 0.026 | 0.030 | 0.0194 | 0.0007 | 0.0604 | 0.000 | 0.009 | 0.000 |
| SPDT | pure | 10.770 | 0.646 | 9.518 | 0.002 | 22.78 | 0.000 | 1.939 | 0.000 |
| SPDT | mix | 0.038 | 0.007 | 0.052 | 0.0011 | 0.0618 | 0.000 | 0.002 | 0.000 |
| SPDTDC | pure | 0.0244 | 0.021 | 0.0173 | 0.0011 | 0.0546 | 0.0001 | 0.0626 | 0.0001 |
| training-mix | mix | 0.0244 | 0.021 | 0.0173 | 0.0011 | 0.0546 | 0.0001 | 0.0626 | 0.0001 |

914

| Space | Training | $E_{trans}$ | $E_{rotation}$ | $E_x$ | $E_y$ | $E_z$ | $E_{roll}$ | $E_{pitch}$ | $E_{yaw}$ |
|---|---|---|---|---|---|---|---|---|---|
| DPDT | pure | 4.094 | 0.044 | 11.257 | 0.007 | 1.018 | 0.000 | 0.132 | 0.001 |
| DPDT | mix | 0.043 | 0.022 | 0.097 | 0.000 | 0.032 | 0.000 | 0.067 | 0.000 |
| ALL | mix | 1.717 | 0.06 | 0.786 | 0.000 | 4.365 | 0.000 | 0.180 | 0.000 |

MONOCULAR CAMERA LOCALIZATION IN LARGE SCALE INDOOR SPARSE LIDAR POINT CLOUD

BACKGROUND

Technical Field

The instant disclosure is related to automated driving systems and specifically providing camera localization utilizing light detection and ranging point clouds.

Background

For a robot to navigate in space autonomously, it has to localize itself precisely within a map of the environment. Therefore, six degree of freedom pose estimation of the localization sensor is one of the enabling technologies for robots such as autonomous cars. Currently, the most commonly used localization sensors are cameras and light detection and ranging (LiDAR). LiDAR generates a point cloud of the environment as a map, and the localization system finds the best registration between the runtime point clouds with respect to a sub-area of the map to infer the LiDAR pose.

Currently, a guess of initial position may be found from a high definition global positioning system (GPS). Possible problems with this approach for mass production may include the cost of high definition GPS and the GPS signal may be unavailable where the sky is obscured such as indoors in parking garages and the like. If no guess of initial position is provided, the LiDAR localization system would require significantly increased compute resources or may fail completely.

Cameras are inexpensive, ubiquitous, and, have given rise to visual odometry (VO) and visual simultaneous localization and mapping (vSLAM). Camera pose may be determined given only visual inputs, without the concurrent use of GPS. However, the one shortcoming with camera based localization is its stability given lighting conditions, the structure of the visual scenes, and its inaccurate perception of the scene depth. In the case of an uneven lighting sequence, such as sudden exposure of bright light from a dark shadow, direct visual odometry or vSLAM may fail. Visual methods often rely on the presence of structures, so the algorithms may find many features to track across frames. As an example, in typical parking garages, large white walls and repetitive pillars are often found, making the VO/vSLAM inefficient. Additionally, when an accurate depth of the scene is unavailable, the visual methods may quickly result in scale drift that leads to sizable accumulative localization error.

Therefore, to better achieve localization, a method is sought which concurrently utilizes a sparse LiDAR point cloud and a camera image to efficiently localize the camera image.

SUMMARY

A first example of camera localization, comprising at least one of receiving a camera image, receiving a LiDAR point cloud, estimating an initial camera pose for the camera image, sampling an initial set of depth projections within the LiDAR point cloud, measuring a similarity of the initial camera pose to the initial set of depth projections and deriving a subsequent set of depth projections based on the measured similarity.

A second example of camera localization, comprising at least one of receiving a camera image, receiving a LiDAR point cloud, estimating an initial camera pose for the camera image, sampling an initial set of depth projections within the LiDAR point cloud, measuring a similarity of the initial camera pose to the initial set of depth projections as a state value, measuring a regression of the similarity of the initial camera pose to the initial set of depth projections, measuring a gradient of the similarity of the initial camera pose to the initial set of depth projections and deriving a subsequent set of depth projections based on the gradient of the similarity.

DETAILED DESCRIPTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Estimating camera pose using camera image inputs within a prior 3D LiDAR point cloud map may provide a possible solution. Cameras capture semantics of an environment is many times greater than LiDAR, and allows localization based on edges.

Major localization approaches currently operate in one sensor regime, whereas a LiDAR and camera belong to different sensor regimes. LiDAR SLAM compares point cloud structures, and vSLAM matches camera image features. Since LiDAR scans are often sparse and dense LiDAR scans are time consuming and expensive, it is preferred to have camera localization work within a sparse point cloud.

In this disclosure, an end-to-end novel neural network structure may provide a solution to camera pose estimation in a LiDAR point cloud. The approach utilizes a monocular camera. Given a mono camera image and initial rough pose estimation, the approach makes a set of depth projections using the point cloud, and feeds the pair of camera image and depth projection to infer a camera pose. This solution utilizes a state value constraint, which is called a resistor module, in the network, to quantify the pose estimation fit and back-propagate that to the network. The resistor module may result in faster network convergence.

Current camera localization utilizing a LiDAR point cloud renders synthetic views from 3D map and compares them with camera images. This method is most suitable when the LiDAR map is dense and the pose transformation between the current camera view and the rendering image is small. However, with changing light conditions and scale drift, this method may suffer from pose jump and accumulative localization error. The disclosed method utilizes communication of the state-value prediction and a pose regression that results in an increased inference speed.

Figure 1:
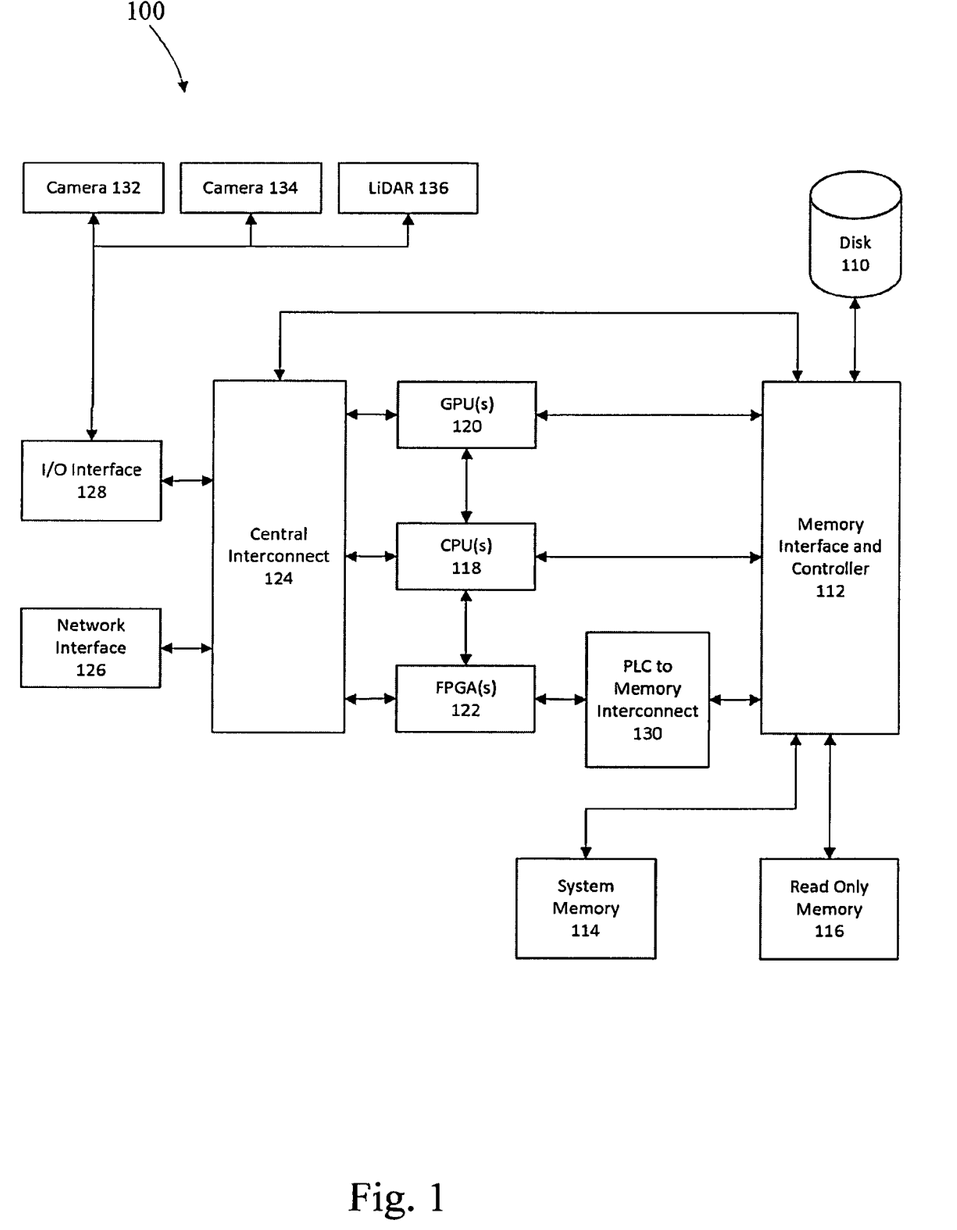
FIG. 1 is a first example system diagram in accordance with one embodiment of the disclosure.

FIG. 1 depicts an example automated parking assistance system 100 that may be used to implement deep neural nets associated with the operation of one or more portions or steps of processes 700 and 800. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a deep neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
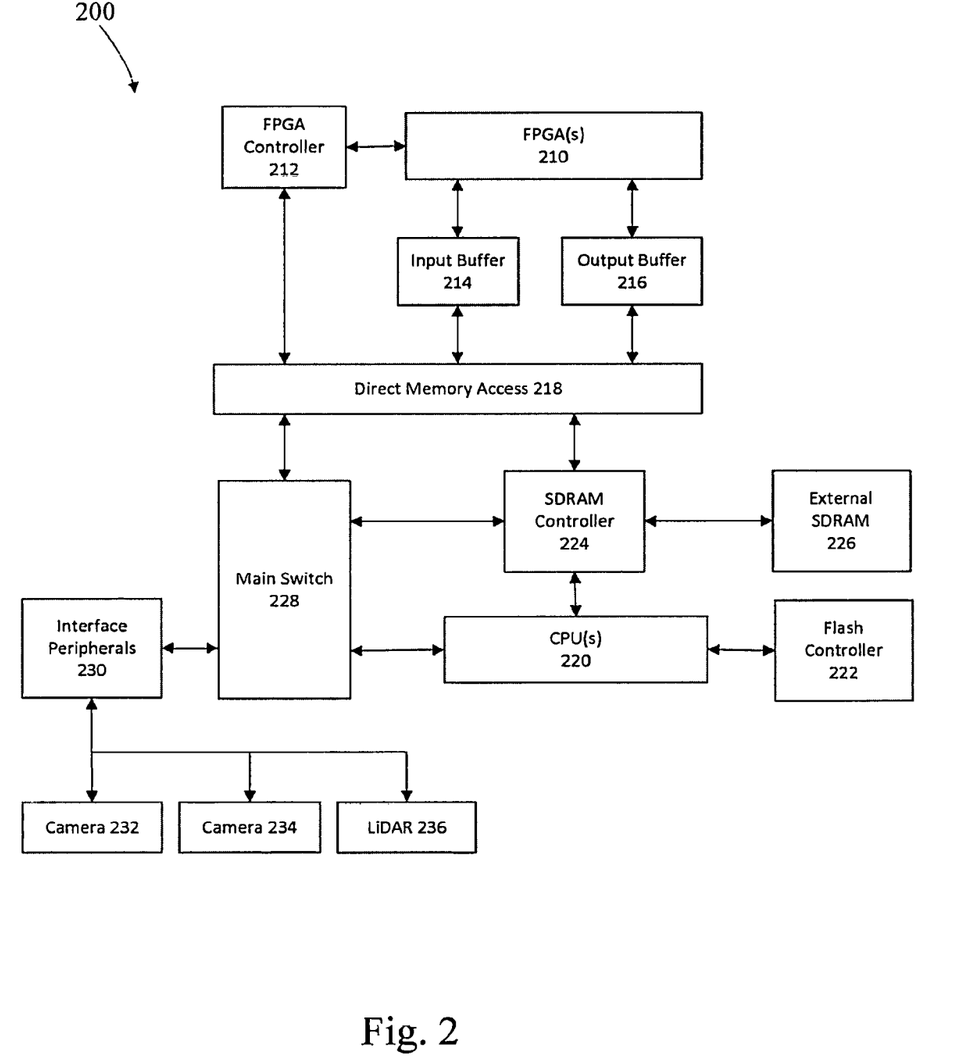
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 connected to forward camera 132, left side camera 134, LiDAR 136 and the network interface 126.

FIG. 2 depicts a second example hybrid computational system 200 that may be used to implement neural nets associated with the operation of one or more portions or steps of flow 500. In this example, the processors associated with the system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, the buffers are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230 connected to forward camera 232, left side camera 234, LiDAR 236. A flash controller 222 controls persistent memory and is connected to the CPU 220.

Figure 3:
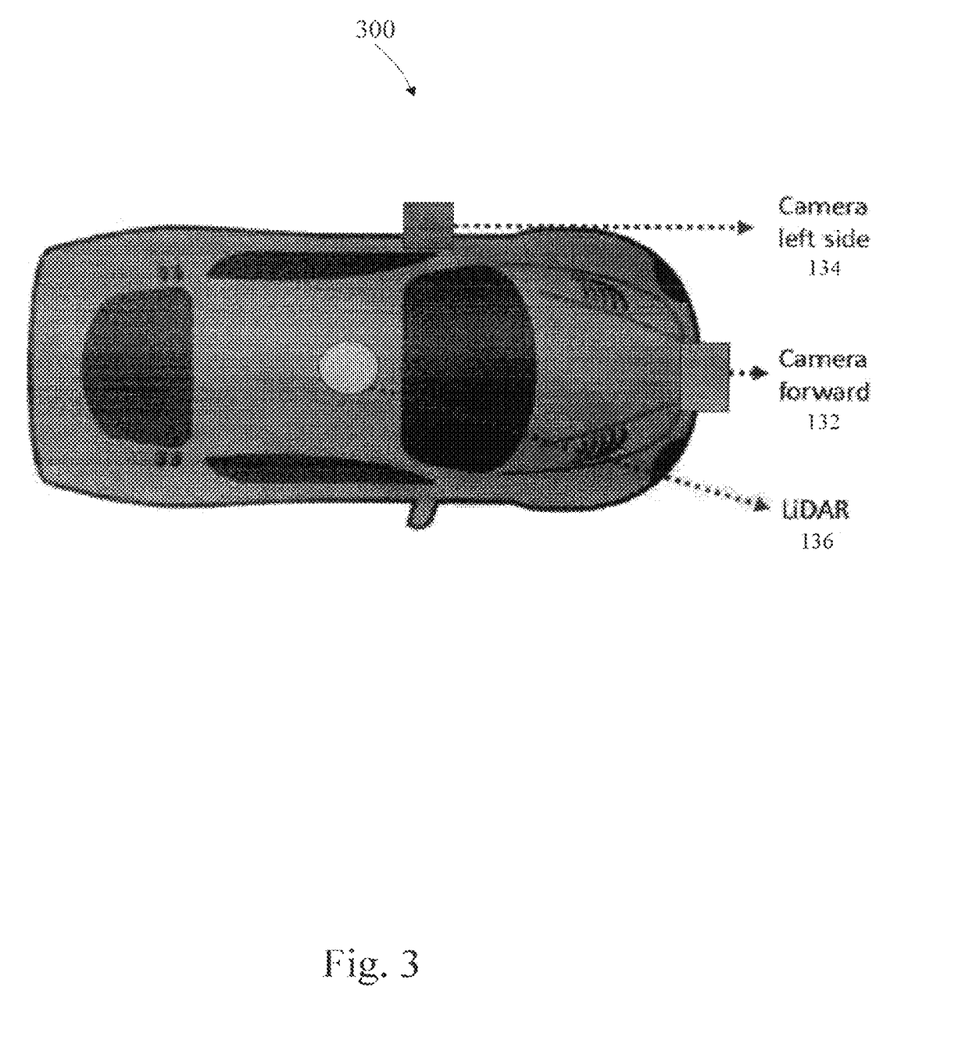
FIG. 3 is an example depiction of a data collection vehicle in accordance with one embodiment of the disclosure.

FIG. 3 discloses a bird's eye view of the stitched view 300 of the disclosed system. The forward camera 132 and the left side camera 134 are red, blue, green (RGB) monocular type camera and provide camera images to the system. The cameras 132 and 134 may also be stereoscopic, infrared, black and white cameras and the like. The LiDAR in this example is top mounted and provides a sparse LiDAR point cloud map of the immediate environment of the vehicle.

Method

The disclosed approach compares the camera image with a set of depth projections that are projected from several pose guesses and quantifies the proximity of each guess towards the real camera pose to decide the sample positions for the next iteration of pose guesses. The disclosed approach operates in camera image feature space rather than inferring depth map from camera images and operating in point cloud space.

Problem Formulation

Formally, a six degree of freedom camera pose is defined as $p=[R,t] \in SE(3)$, where $R \in SO(3)$ is the rotation and $t \in \mathbb{R}^3$ is the translation. A LiDAR map is a set of points in space $M=\{m_i | m_i \in \mathbb{R}^3, i=1, 2, 3, \ldots |M|\}$. A projection P of a LiDAR map from the viewpoint pose $V_p$ is defined as:

$$P(V_p) = G \cdot K \cdot \begin{bmatrix} R_{Vp} & t_{Vp} \\ 0 & 1 \end{bmatrix} M$$

where $$G = \begin{bmatrix} \frac{2}{W} & 0 & 0 & -1 \\ 0 & \frac{-2}{H} & 0 & 1 \\ 0 & 0 & \frac{-2}{z_f - z_n} & \frac{z_f + z_n}{z_f - z_n} \\ 0 & 0 & 0 & 1 \end{bmatrix}$$

is the projection parameter for clipping planes, and $$K = \begin{bmatrix} f_x & \alpha & -c_x & 0 \\ 0 & f_y & -c_y & 0 \\ 0 & 0 & z_n + z_f & z_n x z_f \\ 0 & 0 & -1 & 0 \end{bmatrix}$$

is the set of camera intrinsic parameters.

A pair of camera image I (taken at pose $P_i$) and a depth map D (projected at pose $P_d$) is defined as $$H_{PiPd} = I_{Pi} \otimes D_{Pd}$$

where the $\otimes$ operator computes a representation vector for the pair. The pose difference of $I_{P1}$ and $D_{Pd}$ is defined as $$\Delta P_{i,d} = P_i - P_d, \Delta P_{i,d} \in SE \quad (3)$$

The pose estimation problem can be therefore formulated as $$\widetilde{\Delta P} = {}_{Pd}^{argminE}(H_{Pi,Pd})$$

where E is a function that quantifies the similarity between $I_{Pi}$ and $D_{Pd}$. For the ease of presentation, the pose for depth projection is defined as $P_d$ and the pose from which the camera image is taken is defined as $P_i$.

Due to sparsity of the LiDAR point cloud, the information is not significant enough to be quantified between $I_P$, and $D_{Pd}$ even if taken at the same pose. Therefore, the heuristic post-processing on the sparse depth map and the similarity measurement is inefficient which points to an EnforceNet type learning approach to network design.

Figure 4:
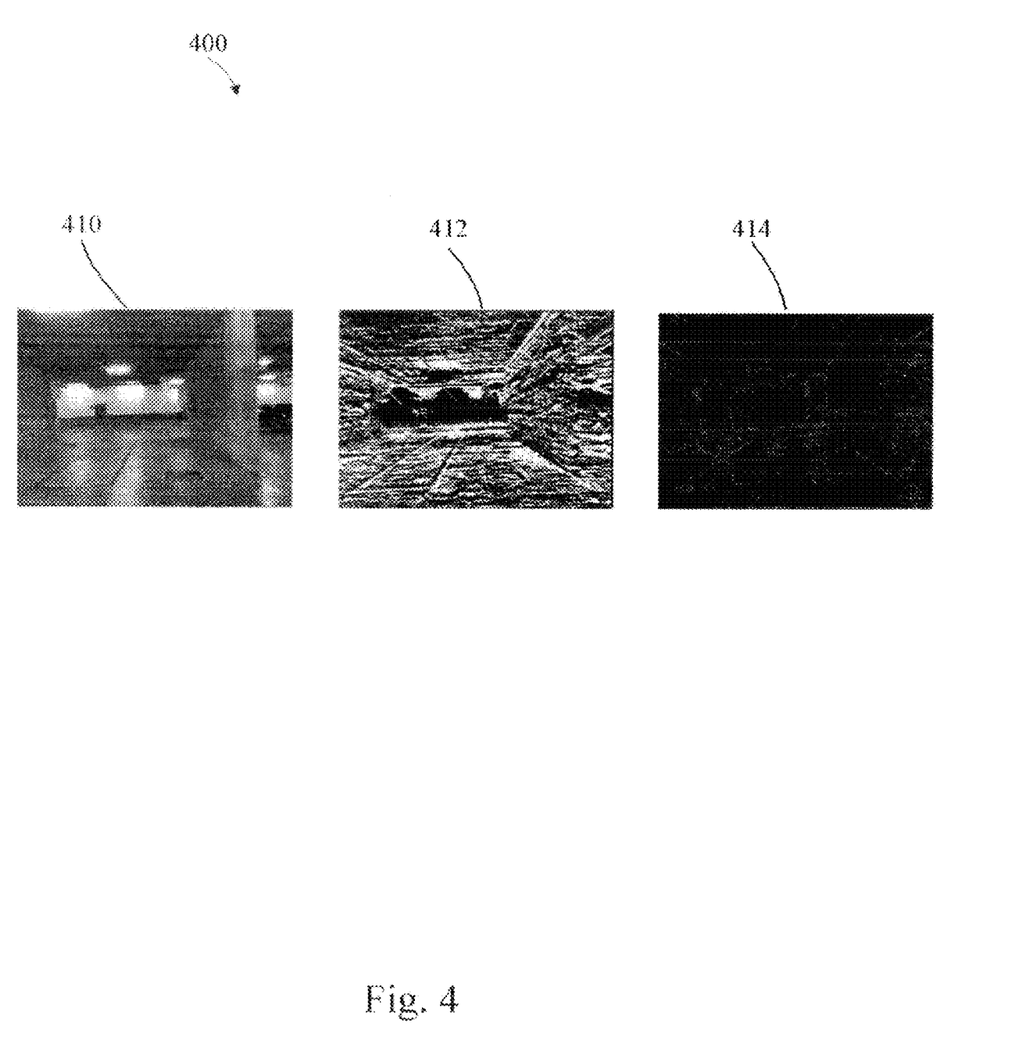
FIG. 4 is an example camera image map in accordance with one embodiment of the disclosure.

FIG. 4 is an example camera image map, in this example 410 is the full camera image, 412 is a filtered view of the camera image and 414 are the edges of the camera image.

Figure 5:
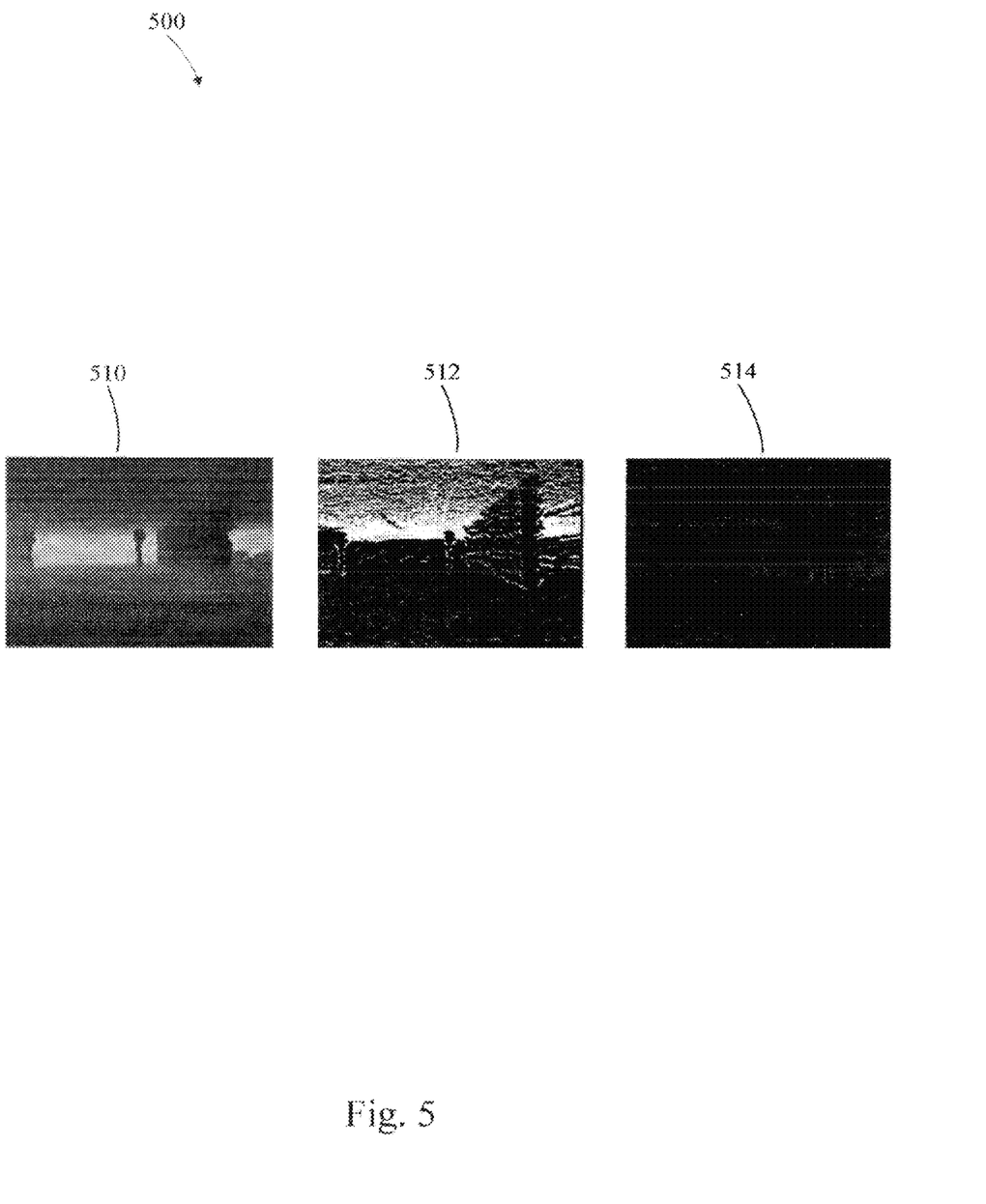
FIG. 5 is an example depth map in accordance with one embodiment of the disclosure.

FIG. 5 is an example depth map, in this example 510 is the full depth map, 512 is a filtered view of the depth map and 514 are the edges of the depth map.

EnforceNet Design

Figure 6:
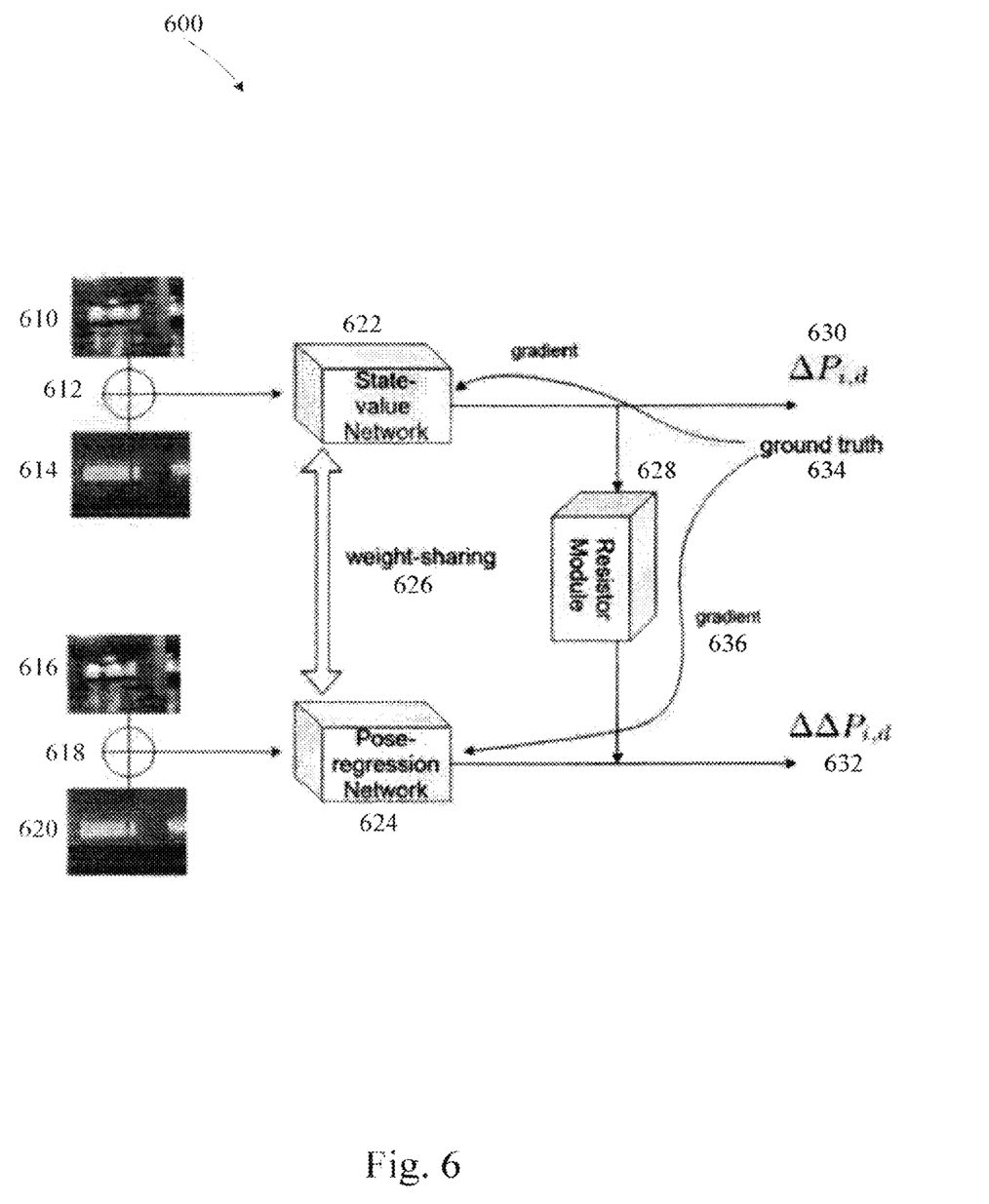
FIG. 6 is an example logic flow of an EnforceNet network in accordance with one embodiment of the disclosure.

FIG. 6 is an example logic flow of the EnforceNet network. Since camera pose estimation is often a real-time task that requires reliable results given various lighting conditions, our design goals for the network are fast, accurate, and generalizable. Ideally, the system should run at a high frequency on embedded hardware with restricted compute resources. The system should function with restricted retraining/fine-tuning applied to different scenes and stable when facing lighting condition variations.

The system leverages prior 3D point cloud M and a multiplicity of depth projections $\{D_j | j \in [1, \infty]\}$ generated based on those depth projections with pose samples $\{D_d | d \in [1, \infty]\}$. The system has the ability to explore training pairs of $H_{i,d}$ with large or small pose differences, and incrementally derive plausible poses that are proximate to $P_i$.

In order to infer Pi for one camera image, a set of $P_d$ within M may be randomly sampled and $E(H_{Pi,Pd})$ measured to derive a subsequent batch of $\{P_d\}$, until convergence is achieved. This process may be formulated as a Markov decision process (MDP) wherein the future pose estimates are independent from the past given the present estimates, based on reinforcement learning frameworks.

A virtual agent explores the space for the best pose and $H_{Pi,Pd}$ is treated as a state for that virtual agent. A state-value function F ($\Delta P_{i,d}$) is defined to be a monotonically decreasing function. Therefore, a state has a high value if $\Delta_{i,d}$ is low, and the state value is low when $\Delta P_{i,d}$ is high.

In one example a first network quantifies state-value, and a second network regresses $\Delta P_{i,d}$. The input for the second network is also the camera image-depth projection pairs $H_{Pi,Pd}$, and its labels are their respective ground truth pose differences.

FIG. 6 depicts two sets of camera images 610 and 616 and two sets of depth maps 614 and 620, being compared 612 and 618 respectively. One set of camera images and depth maps are routed to a state value network 622 and the other set to a pose regression network 624 which share weights 626. The state value network 622 and the pose regression network 624 are connected by a resistor module 628 that constrains state values. The output of the state value network is 630 $\Delta P_{i,d}$ and the output of the pose regression network is 632 $\Delta\Delta P_{i,d}$. Fed back into the state value network and the pose regression network are the ground truth 634 and the gradient 636.

Pose Regression Network

Figure 7:
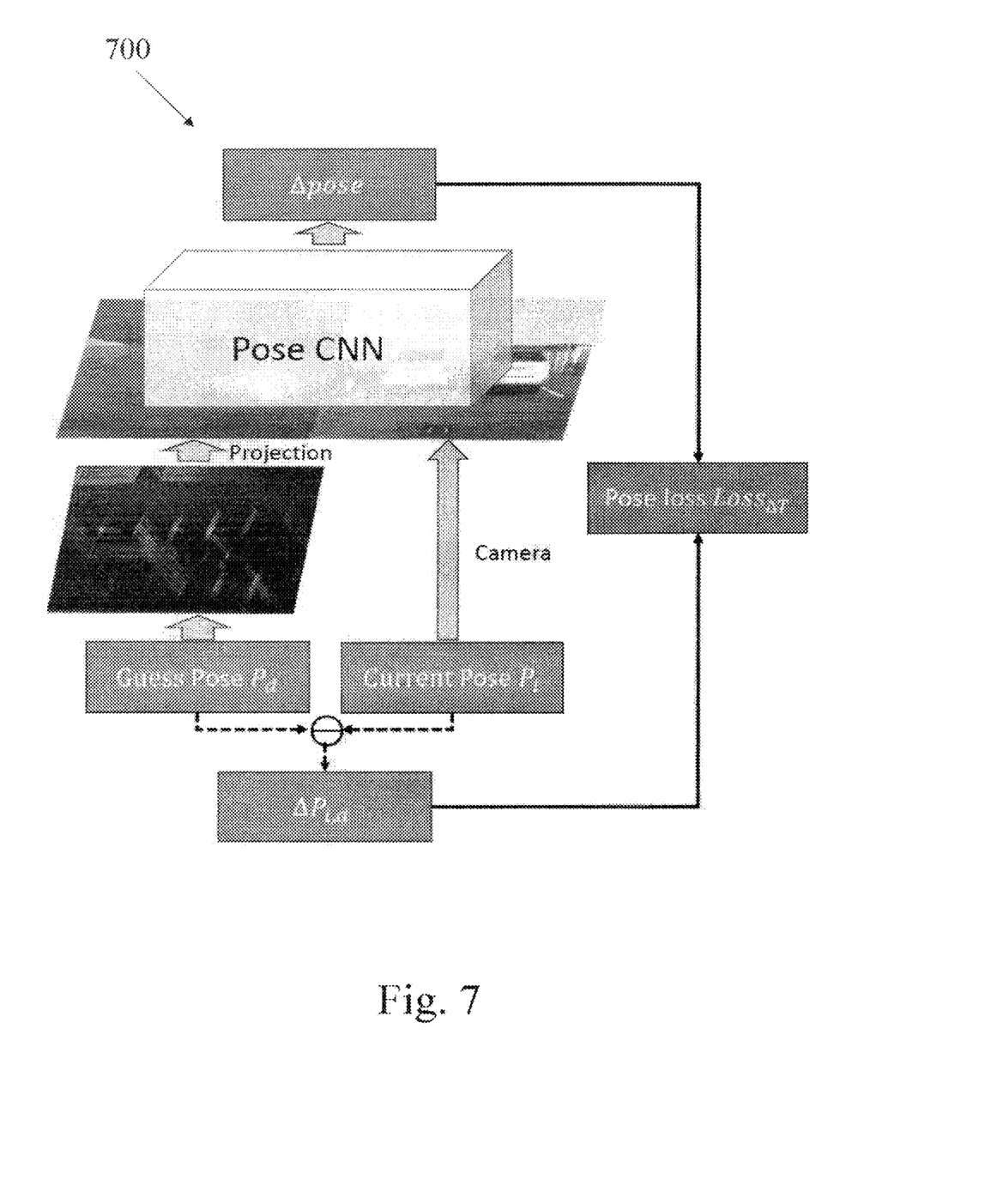
FIG. 7 is an example logic flow of a pose regression network in accordance with one embodiment of the disclosure.

FIG. 7 is an example logic flow of the pose regression network. The pose regression network and the state-value network are connected by the resistor module, where $\Delta P_{i,d}$ predictions are used as state-value labels. In this example if the $\Delta P_{i,d}$ is large, the state value is small, since the depth projection is far from the image. When the $\Delta$pose is small small the state value is large. The resistor module enforces the state-value network to learn the ground truth $\Delta P_{i,d}$. Weights are shared between the pose regression network and the state value network. Weight sharing adds regulation to the $\Delta P_{i,d}$ regression network, since the state-value gradient and the ground truth $\Delta P_{i,d}$ back-propagate through the regression network. The state-value network additionally learns the ground truth information more efficiently, from weight-sharing as the training complexity and the inference speed are both improved.

FIG. 7 depicts an example of the pose regression network in which the current pose 712 from the camera image 720 $P_i$ and the guess pose 710 from the LiDAR point cloud 718 $P_d$ are fed into a pose convolutional neural network 722 which outputs a $\Delta$pose 724 which is fed into a pose loss module 716 and the current pose and the guess pose are fed into $\Delta P_{i,d}$ which is also fed into the pose loss module 716.

EnforceNet Layout

Figure 8:
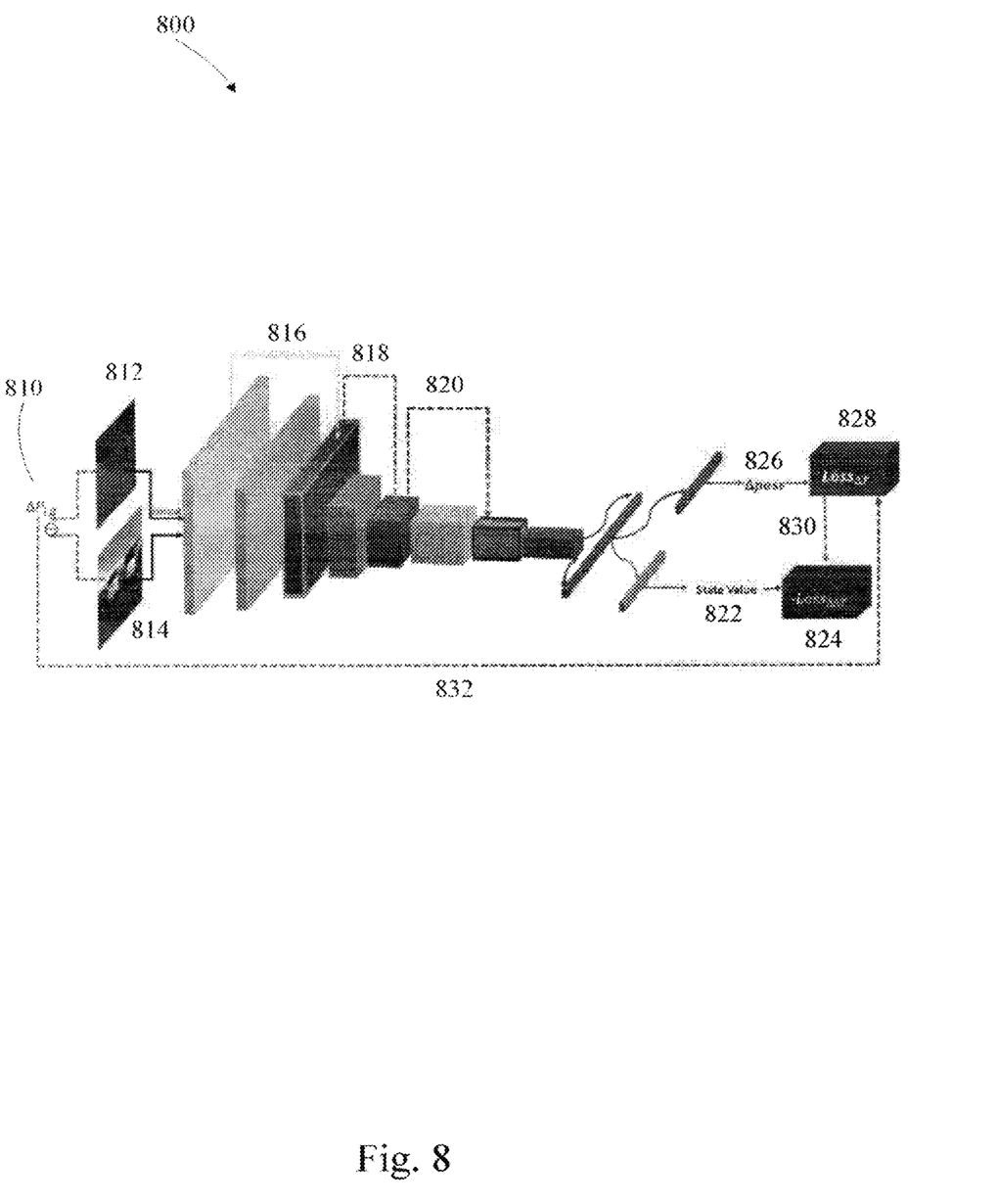
FIG. 8 is an example convolutional neural network layout of EnforceNet in accordance with one embodiment of the disclosure.

FIG. 8 is an example convolutional neural network layout of EnforceNet. In one example network architecture the backbone network to implement the system, method and computer readable media, a 7-layer ConvNet was utilized as depicted in FIG. 8. The camera image and depth projection pair $H_{Pi,Pd}$ is the network input. The $\otimes$ operator is a stacking operator in this example. This example architecture is lightweight and accurate for the performance of camera localization.

To train the network, a simple Euclidean error of combining translation and rotation is utilized. The ground truth transformation $\Delta P_{t,i,d}$ (translation $t_t$ and rotation $R_t$) at timestamp t between the depth projection and the camera image capture can be described as:

$$\Delta P_{t,i,d} = [\Delta R_{t,i,d}, \Delta t_{t,i,d}]$$

The prediction transformation $\widetilde{\Delta P}$ can be combined with $$\widetilde{\Delta P} = [\widetilde{\Delta R_t}, \widetilde{\Delta t_t}]$$

The pose loss can be defined as the weighted sum of error of the two components from rotation and translation below ($\alpha_1$ is the rotation loss in the pose loss, $\alpha_2$ is the translation loss in the pose loss):

$$L(\Delta P_{t,i,d}, \widetilde{\Delta P}) = \Sigma_{t=1}^T (\alpha_1 \|\Delta R_{t,i,d} - \Delta R_{t\|2} + \alpha_2 \|\Delta t R_{t,i,d} - \Delta t_{t\|2})$$

In addition to pose loss, the state value loss is added. The state value has the ability to evaluate current pose prediction. To train the state value function, the negative pose $L_{oss}$ is regarded as ground truth $S_t$, and the state value prediction may be represented as F ($\Delta P_{i,d}$). So the state value pose $L_{F(\Delta Pt,i,d)}$ may be represented as follows ($\alpha 3$ is the weight of state value loss):

$$L(F(\Delta P_{t,i,d}), S_t) = \Sigma_{t=1}^T (\alpha_3 \|S_t - F(\Delta P_{t,i,d}\|2)$$

In conclusion, the total $L_{oss}$ in our network is:

$$L_{oss} = L(\Delta P_{t,i,d}, \widetilde{\Delta P}) + L(F(\Delta P_{t,i,d}), S_t)$$

To efficiently render the depth map, the agent performs depth projection and depth map augmentation. To generate additional camera image and depth projection pairs, the pose of the camera was perturbed with random noise to render additional depth projections. The perturbation results in image pairs with a known ground truth $\Delta P$. The permutation rotation of the pose is ±5° and the translation permutation is ±1 m. In one example LiDAR SLAM and sensor synchronization was utilized to get camera image key frames. A number of image pairs of key frames with ground truth pose difference for parking garages $\{G_{ijk} | \in [1,2], j \in [1,2,3], k \in [1,2[\}$ were generated. To train the model, the dataset was divided into 60% training, 30% validation, and 10% testing.

An example layout of the EnforceNet convolutional neural network (CNN) is depicted in FIG. 8. The network intakes a camera image 814 and depth projection 812 to create $\Delta P_{t,d}$ 810. The camera image and the depth projection are fed into the various modules of the network 816-820 which outputs a state value 822 and a $\Delta$pose 826. The $\Delta P_{t,d}$ 810 is fed into a Loss$_{\Delta t}$ module 828 along with the $\Delta$pose 826. The Loss$_{\Delta t}$ module 828 outputs 830 a signal to a −Loss$_{\Delta\Delta t}$ module 824. The ~Loss$_{\Delta\Delta t}$ module 824 received the signal 830 and state value 822.

Localization Accuracy

Figure 9:
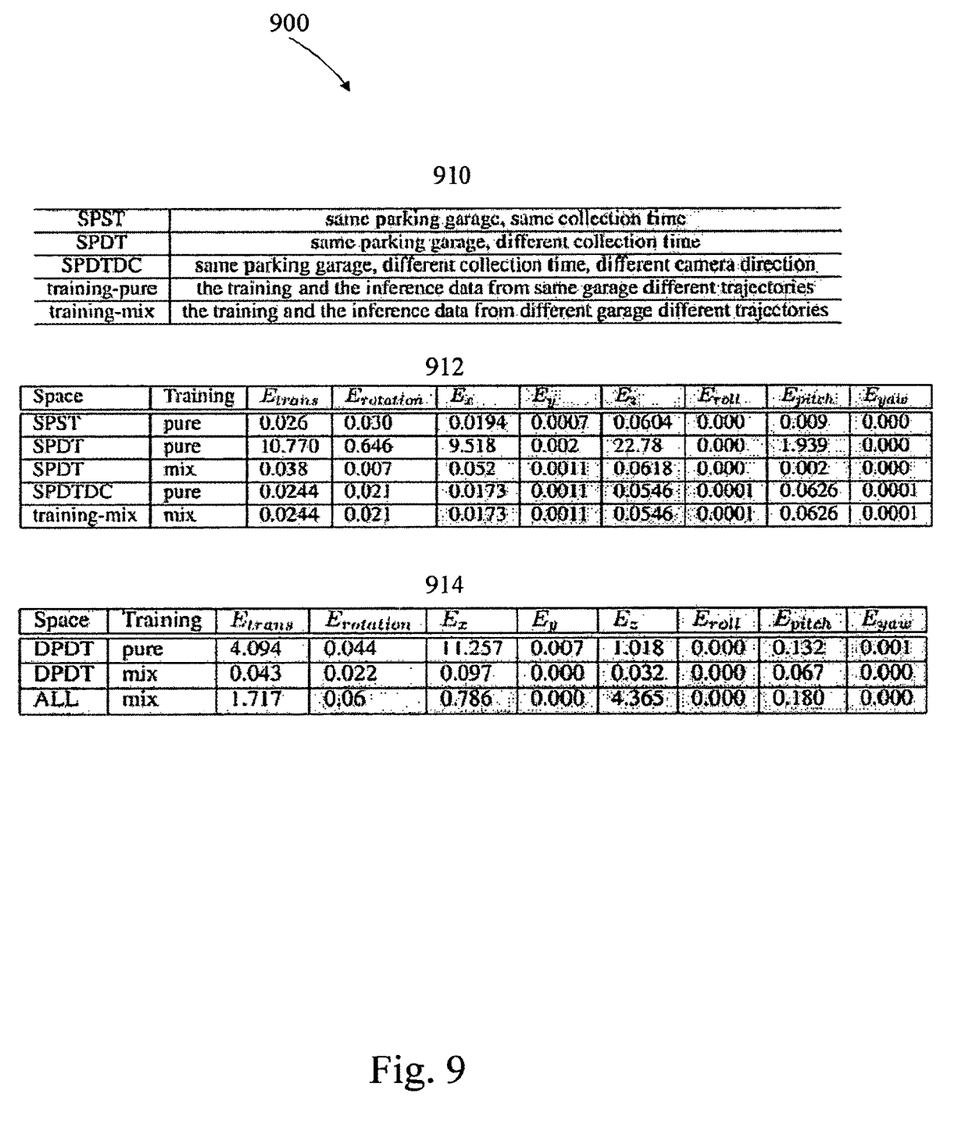
FIG. 9 is example data output for different training settings of the system in accordance with one embodiment of the disclosure.

Localization accuracy was confirmed using data from different parking garages at different times to demonstrate localization accuracy and generalizability. FIG. 9, table 910 summarized some combinations of garage, time and camera direction.

The visual appearance of the same garage can be significantly different due to parking conditions and time of the day. To verify the model retains accuracy when facing visual appearance changes, performance tests were run for several training settings with different camera image trajectories. FIG. 9, table 912 contains the details of localization accuracy for one garage. The data indicates a translation error of less than 10 cm in the test data set for average cases, with the rotation error hovering at 0 degrees.

The validated the model is efficient once being trained by the data from a single garage. FIG. 9, table 914 indicates the mix version of training data increases the speed of convergence. Therefore, the data indicates similar results in the same garage scenario and the cross-garage scenario.

Figure 10:
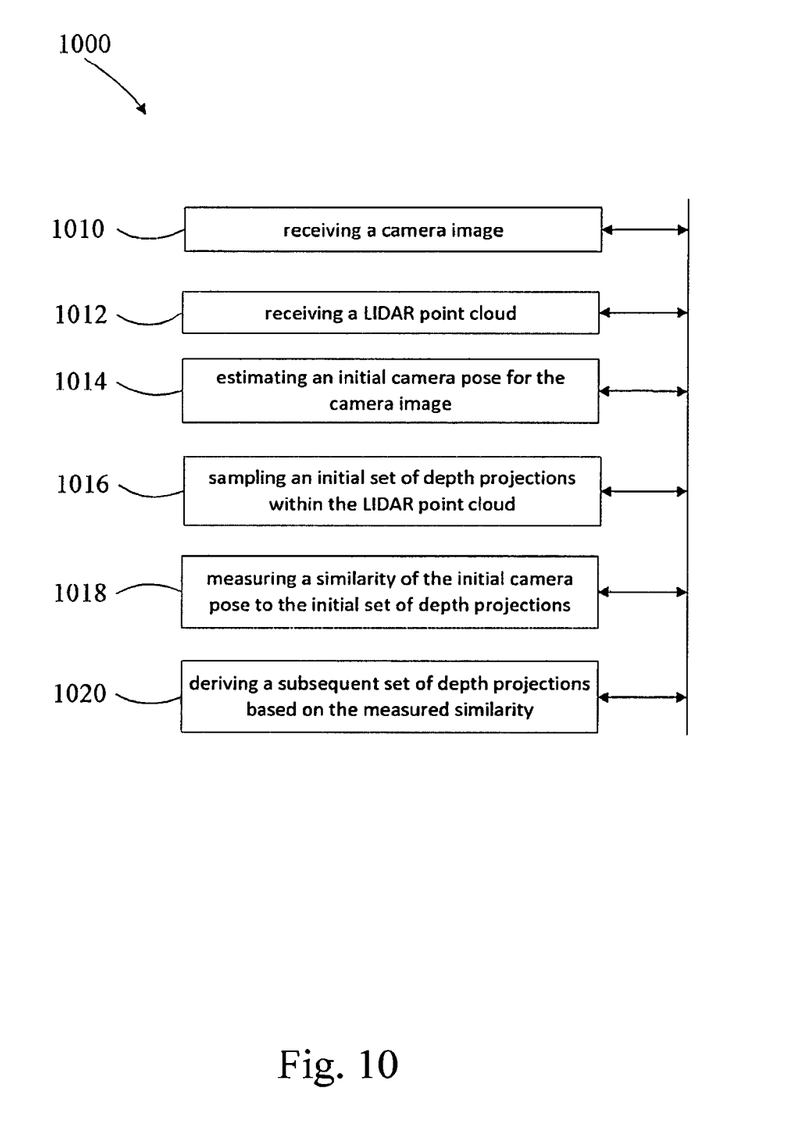
FIG. 10 is a first example method of camera localization in accordance with one embodiment of the disclosure.

A method of camera localization is depicted in FIG. 10, includes, receiving 1010 a camera image, receiving 1012 a LIDAR point cloud, estimating 1014 an initial camera pose for the camera image, sampling an 1016 initial set of depth projections within the LIDAR point cloud, measuring a 1018 similarity of the initial camera pose to the initial set of depth projections and deriving a 1020 subsequent set of depth projections based on the measured similarity.

The method of FIG. 10 may additionally provide the deriving a subsequent set of depth pose projections based on minimization of the measured similarity and provide that the similarity is a state-value based function.

The method of FIG. 10 may further include the steps of back-propagating the derivation of the subsequent set of depth projections, measuring a pose loss, subsequently deriving the subsequent set of depth projections based on the measured similarity until convergence, regressing a ground truth pose difference based on the measured similarity and back-propagating the state-value based function as a gradient and the ground truth pose difference.

Figure 11:
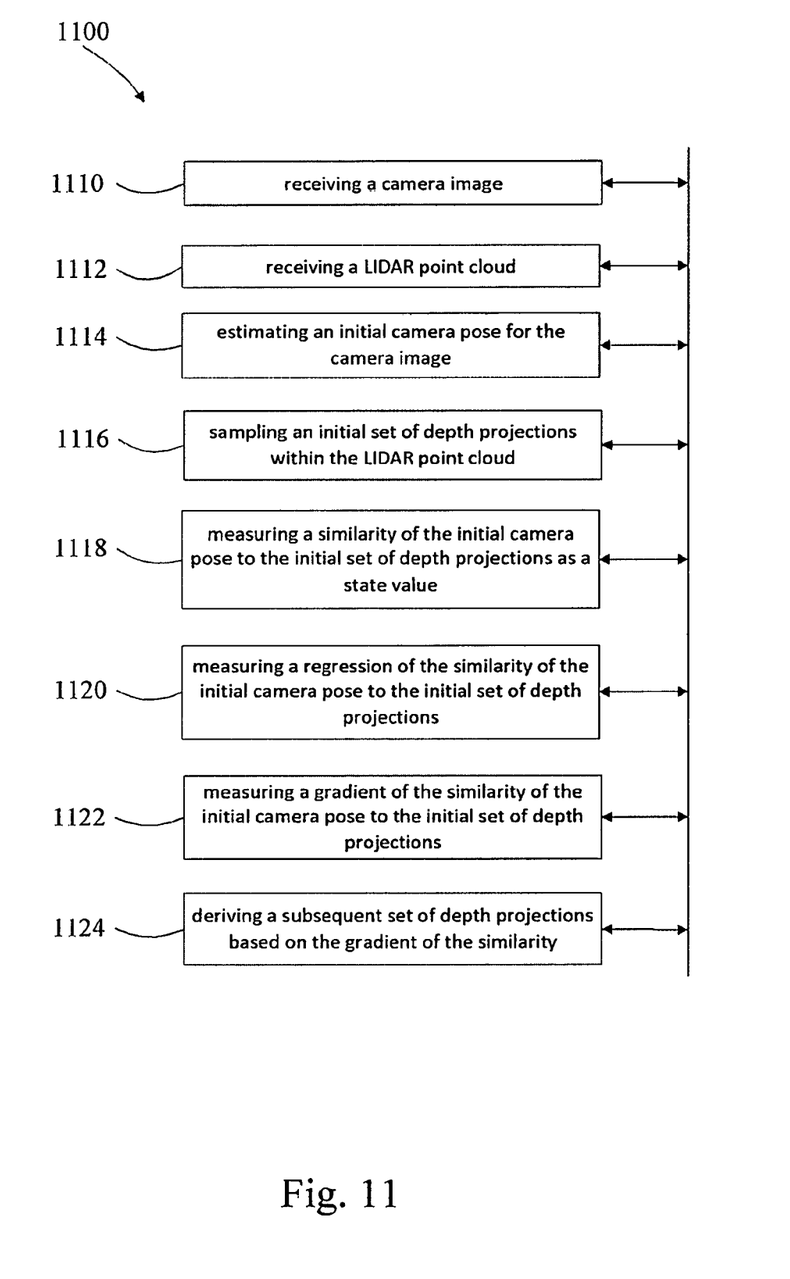
FIG. 11 is a second example method of camera localization in accordance with one embodiment of the disclosure.

A method of camera localization is depicted in FIG. 11, includes, receiving 1110 a camera image, receiving 1112 a LIDAR point cloud, estimating 1114 an initial camera pose for the camera image, sampling 1116 an initial set of depth projections within the LIDAR point cloud, measuring 1118 a similarity of the initial camera pose to the initial set of depth projections as a state value, measuring 1120 a regression of the similarity of the initial camera pose to the initial set of depth projections, measuring 1122 a gradient of the similarity of the initial camera pose to the initial set of depth projections and deriving 1124 a subsequent set of depth projections based on the gradient of the similarity.

The method of FIG. 11 may additionally provide the measuring of the similarity is performed by a first network, the measuring of the regression of the similarity is performed by a second network and the restraining the state value of the measured similarity fed back to the first network and the second network is performed by a resistor module.

The method of FIG. 11 may further include weight sharing between the first network and the second network, restraining the state value of the measured similarity fed back to the first network and the second network and subsequently deriving the subsequent set of depth projections based on the measured similarity until convergence.

The disclosure proffers that the network EnforceNet provides an end-to end solution for camera pose localization within a large scale sparse 3D LiDAR point cloud. The EnforceNet network has a resistor module and a weight-sharing scheme. Experiments on real world datasets of large scale indoor parking garages, demonstrated that EnforceNet has reached the state-of-the-art localization accuracy with excellent generalization capability.

Those of skill in the art would appreciate that the various illustrative blocks, modules, elements, components, methods, and algorithms described herein may be implemented as electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of camera localization, comprising:
receiving a camera image;
receiving a LiDAR point cloud;
estimating an initial camera pose for the camera image;
sampling an initial set of depth projections within the LiDAR point cloud;
measuring a similarity of the initial camera pose to the initial set of depth projections; and
deriving a subsequent set of depth projections based on the measured similarity in a camera image feature space.

2. The method of camera localization of claim 1 wherein the deriving a subsequent set of depth pose projections is based on minimization of the measured similarity.

3. The method of camera localization of claim 1 further comprising back-propagating the derivation of the subsequent set of depth projections.

4. The method of camera localization of claim 1 wherein the measured similarity is a state-value based function.

5. The method of camera localization of claim 1 further comprising measuring a pose loss.

6. The method of camera localization of claim 1 wherein the LiDAR point cloud is a sparse dataset.

7. The method of camera localization of claim 1 further comprising subsequently deriving the subsequent set of depth projections based on the measured similarity until convergence.

8. The method of camera localization of claim 4 further comprising regressing a ground truth pose difference based on the measured similarity.

9. The method of camera localization of claim 8 further comprising back-propagating the state-value based function as a gradient and the ground truth pose difference.

10. A method of camera localization, comprising:
receiving a camera image;
receiving a LiDAR point cloud;
estimating an initial camera pose for the camera image;
sampling an initial set of depth projections within the LiDAR point cloud;
measuring a similarity of the initial camera pose to the initial set of depth projections as a state value;
measuring a regression of the similarity of the initial camera pose to the initial set of depth projections;
measuring a gradient of the similarity of the initial camera pose to the initial set of depth projections; and
deriving a subsequent set of depth projections based on the gradient of the similarity in a camera image feature space.

11. The method of camera localization of claim 10 wherein the measuring of the similarity is performed by a first network.

12. The method of camera localization of claim 11 wherein the measuring of the regression of the similarity is performed by a second network.

13. The method of camera localization of claim 12 further comprising weight sharing between the first network and the second network.

14. The method of camera localization of claim 13 further comprising restraining the state value of the measured similarity fed back to the first network and the second network.

15. The method of camera localization of claim 14 wherein the restraining the state value of the measured similarity fed back to the first network and the second network is performed by a resistor module.

16. The method of camera localization of claim 15 further comprising subsequently deriving the subsequent set of depth projections based on the measured similarity until convergence.

* * * * *